US009895729B2

(12) United States Patent
Perpezat et al.

(10) Patent No.: US 9,895,729 B2
(45) Date of Patent: Feb. 20, 2018

(54) MIXING TOOL FOR TREATING A PORTION OF SOIL

(71) Applicant: SOLETANCHE FREYSSINET, Rueil Malmaison (FR)

(72) Inventors: Daniel Perpezat, Rueil Malmaison (FR); Jean-François Mosser, Rueil Malmaison (FR)

(73) Assignee: SOLETANCHE FREYSSINET, Rueil Malmaison (FR)

(*) Notice: Subject to any disclaimer, the term of this patent is extended or adjusted under 35 U.S.C. 154(b) by 0 days.

(21) Appl. No.: 14/650,637

(22) PCT Filed: Dec. 5, 2013

(86) PCT No.: PCT/FR2013/052953
§ 371 (c)(1),
(2) Date: Jun. 9, 2015

(87) PCT Pub. No.: WO2014/091120
PCT Pub. Date: Jun. 19, 2014

(65) Prior Publication Data
US 2015/0314344 A1 Nov. 5, 2015

(30) Foreign Application Priority Data

Dec. 11, 2012 (FR) ...................... 12 61906

(51) Int. Cl.
B09C 1/02 (2006.01)
B09C 1/08 (2006.01)
(Continued)

(52) U.S. Cl.
CPC ............. B09C 1/02 (2013.01); B01F 7/16 (2013.01); B09C 1/08 (2013.01); E02D 3/00 (2013.01); E02D 5/46 (2013.01); B09C 2101/00 (2013.01)

(58) Field of Classification Search
CPC combination set(s) only.
See application file for complete search history.

(56) References Cited

U.S. PATENT DOCUMENTS 5,005,980 A * 4/1991 Zimmerman ....... B01F 7/00925
241/101.8
5,794,727 A * 8/1998 Murray .................. E21B 10/44
175/313
(Continued)

FOREIGN PATENT DOCUMENTS

EP 1878833 A1 1/2008
FR 2635129 A1 2/1990
(Continued)

Primary Examiner — Kyle Armstrong
(74) Attorney, Agent, or Firm — MH2 Technology Law Group, LLP

(57) ABSTRACT

A device (10) for treating a portion of soil comprises a rotary shaft (20), at least one deployable mixer tool (40) secured to the rotary shaft (20), and a longitudinal pipe (22) for injecting a fluid in the proximity of the mixer tool (40). According to the invention, the treatment device (10) further includes a boring tool (24) situated at the bottom end of the shaft (20), an outer tubular element (30) extending parallel to the rotary shaft (20), the rotary shaft (20) being arranged inside said tubular element (30), and a coupling system (50) between the rotary shaft (20) and the tubular element (30). In a first configuration, the coupling system (50) is suitable for constraining the tubular element (30) and the rotary shaft (20) to move together in rotation about the main axis (X), in at least one direction of rotation, and for constraining the tubular element (30) and the rotary shaft (20) to move together in translation along the main axis (X), at least in the downstream direction. These movements in rotation and translation can be released in a second configuration of the coupling system (50).

15 Claims, 9 Drawing Sheets

(51) Int. Cl.
    *E02D 3/00*     (2006.01)
    *B01F 7/16*     (2006.01)
    *E02D 5/46*     (2006.01)

(56) References Cited

U.S. PATENT DOCUMENTS

| | | | | |
|---|---|---|---|---|
| 6,142,712 A | * | 11/2000 | White | E02D 5/40 |
| | | | | 175/220 |
| 2011/0188947 A1 | * | 8/2011 | Biserna | E02D 5/44 |
| | | | | 405/268 |
| 2012/0163921 A1 | * | 6/2012 | Ditillo | E02D 7/22 |
| | | | | 405/232 |

FOREIGN PATENT DOCUMENTS

| | | | | |
|---|---|---|---|---|
| GB | 102250 | * | 0/1915 | |
| JP | 411036767 A | * | 2/1999 | |

\* cited by examiner

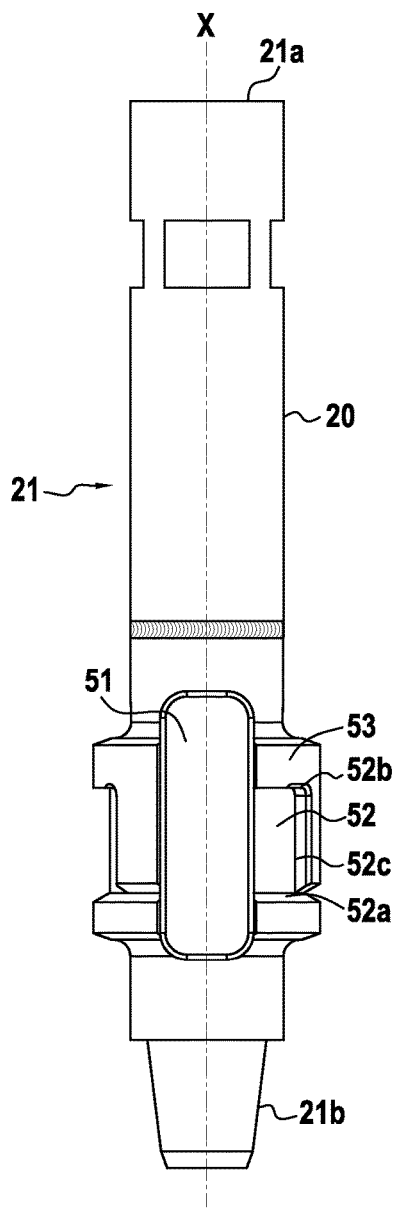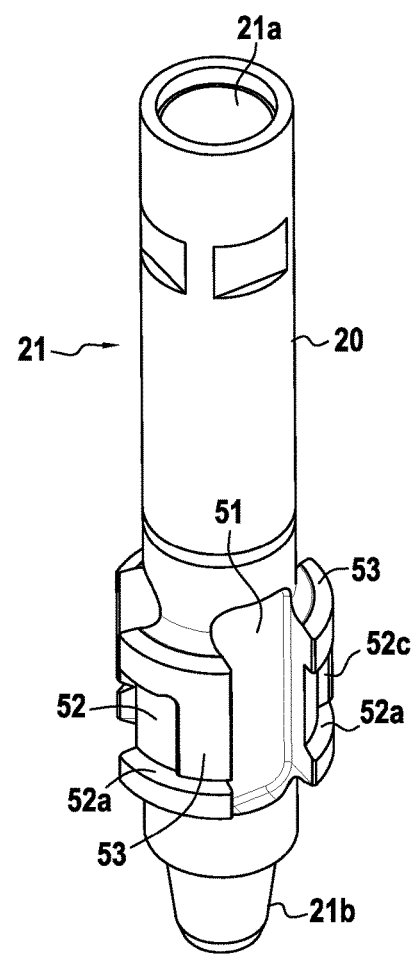
FIG.4
FIG.5

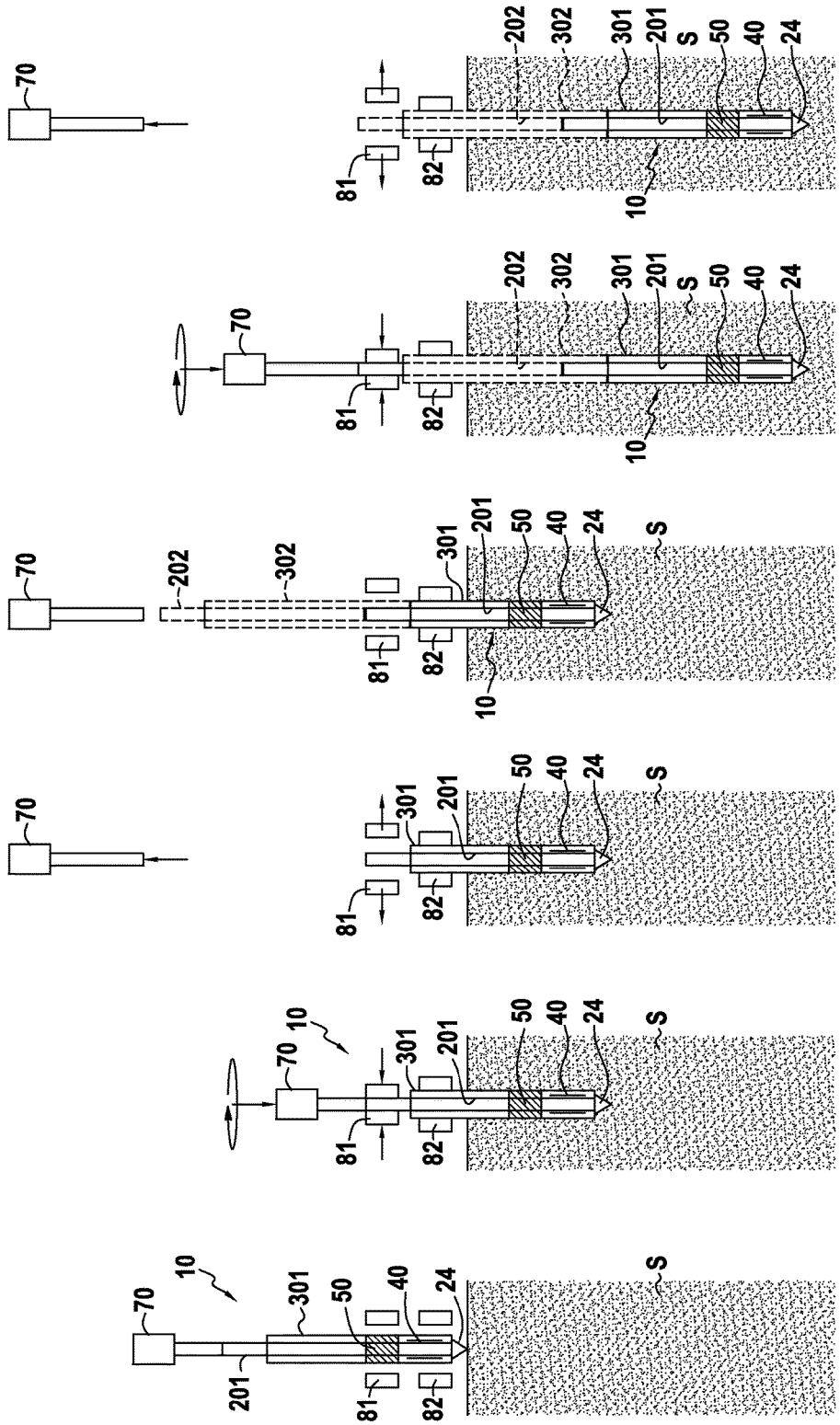

MIXING TOOL FOR TREATING A PORTION OF SOIL

TECHNICAL FIELD

The present invention relates to the field of treating portions of soil, in particular for the purpose of improving its mechanical, physical, and/or chemical characteristics.

In particular, the present invention relates to a device for treating a portion of soil (referred to below as a treatment device) by mixing said soil with another material, and it also relates to a method of treating soil that is performed with the help of the device.

More particularly, the present invention relates to a treatment device of the type comprising a rotary shaft extending along a main axis and presenting a top end pointing upstream and a bottom end pointing downstream, at least one deployable mixer tool fastened to the rotary shaft in the vicinity of its bottom end, and a longitudinal pipe for injecting a fluid in the proximity of the mixer tool.

BACKGROUND OF THE INVENTION

Document EP 1 878 833 describes a treatment device of the above-specified type. When it is desired to treat a portion of soil with such a device, it is necessary to perform a first step of boring in order to form a tubular cavity in the soil. This first step is performed with the help of a distinct boring tool, which is then extracted from the borehole prior to inserting the treatment device. The tubular cavity may be in the form of a simple borehole. Another solution consists in introducing tubing into the soil and then boring within the tubing in order to make the cavity. In a second step, the treatment device is inserted inside the cavity and is moved along the cavity until its bottom end penetrates into the portion of soil that is to be treated. The mixer tool is then deployed, the shaft is set into rotation, and a fluid is injected simultaneously into the portion of soil via the bottom end of the shaft. The first step of making the tubular cavity requires the use of boring tools and occupies time, which as a result is not used for the actual operation of treating the soil. When the tubular cavity is defined by a tube, removing the tube constitutes a third step that is additional to the two preceding steps, thereby further reducing the productivity of the treatment method.

OBJECT AND SUMMARY OF THE INVENTION

An object of the invention is to provide a treatment device and method that substantially overcome the above-mentioned drawbacks.

With a treatment device of the above-specified type, this object is achieved by the fact that the device further comprises a boring tool situated at the bottom end of the shaft, an outer tubular element extending along an axis parallel to the main axis of the rotary shaft, the rotary shaft being arranged inside said tubular element, and a coupling system between the rotary shaft and the tubular element, said coupling system being suitable in a first configuration for constraining the tubular element and the rotary shaft to move together in rotation about the main axis, in at least one direction of rotation, and for constraining the tubular element and the rotary shaft to move together in translation along the main axis, at least in the downstream direction, and said coupling system being suitable in a second configuration for releasing said movement in rotation and in translation.

The device of the invention is both a boring device and a device for mixing soil with one or more other materials.

The boring tool is provided directly at the bottom end of the rotary shaft, such that a borehole can be made progressively as the device advances. Because of the coupling system between the rotary shaft and the tubular element, the tubular element can also be introduced into the soil together with the rotary shaft during the boring operation.

It should be recalled that the boring operation is necessary when the portion of soil for treatment is spaced apart from the ground surface by a layer of soil that is not to be treated, in particular when the columns of soil that are treated need to be made under a layer of soil that is to be left untreated.

Because of the coupling between the shaft and the tubular element, the treatment device can be caused to move in rotation and in translation in the soil by means of a device having a simple drive head. The drive applied to the rotary shaft in rotation and in translation is transmitted to the tubular element by the coupling system while it is in its first configuration so that the two elements move jointly.

When the coupling system is put into its second configuration, the rotary shaft and the tubular element are released to perform relative movements in rotation and in translation. The mixer tool housed in the tubular element while the coupling system is in its first configuration can then be caused to extend from the tubular element and be introduced into the portion of soil that is to be treated.

By using the mixer tool, the treatment device of the invention is then adapted to perform an operation commonly known as "soil mixing", which consists in destructuring the soil and then in mixing the destructured soil with a fluid in order to modify the characteristics of the treated portion of soil. By way of example, the fluid may be a reactive fluid, a hardening slip, in particular a hydraulic binder, or a gas conveying solid particles.

It is particularly suitable for operations of in situ depollution. Under such circumstances, the mixer tool destructures the soil and then mixes it with a chemical reagent.

During treatment, under the effect of injecting a fluid into the soil, a certain quantity of material may tend to escape towards the ground surface. With the provisions of the invention, any rise of such materials, and in particular polluting materials, happens via a passage that is situated between the rotary shaft and the outer tubular element, so the soil that is situated around the outer tubular element thus remains protected.

In an embodiment, the deployable mixer tool comprises at least one deployable mixer arm fastened to the bottom end of the rotary shaft and extending laterally relative to the longitudinal direction of the shaft, said arm presenting a deployed position and a retracted position, such that in the deployed position the span of the mixer tool is greater than the outside diameter of the tubular element to enable the portion of soil to be treated by rotating the shaft, and in the retracted position, the mixer tool is suitable for being inserted inside the tubular element.

In an embodiment, the mixer tool further includes spring means suitable for causing the mixer arm to deploy out from the tubular element and for enabling it to return into its retracted position while the bottom portion of the shaft is being inserted in the tubular element.

The deployed position is then the natural position of the retractable arm, i.e. its position in the absence of any external constraint, the arm extends laterally relative to the longitudinal direction of the shaft by being moved away therefrom by the spring means. While the mixer tool is being inserted into the tubular element, it can be understood that the inside wall of the tubular element acts on the arm so as to bring it into the retracted position, i.e. towards the shaft.

In the present description, and except where specified to the contrary, an axial direction is a direction parallel to the main axis of the rotary shaft. In addition, a radial direction is a direction that is perpendicular to the main axis and that intersects the main axis. Unless specified to the contrary, the adjectives and adverbs "axial", "radial", "axially", and "radially" are used relative to the above-specified axial and radial directions. In the same manner, an axial plane is a plane containing the main axis of the rotary shaft and a radial plane is a plane perpendicular thereto. Likewise, an axial section is a section defined in an axial plane, and a radial section is a section defined in a radial plane.

Unless specified to the contrary, the adjectives "inside" and "outside" are used relative to a radial direction such that the inside (i.e. radially inner) portion or face of an element is closer to the main axis than the outside (i.e. radially outer) portion or face of the same element.

In addition, unless specified to the contrary, the adjectives "top" and "bottom" are used with reference to the direction in which the device is inserted into the soil, i.e. the boring direction, the tool being introduced by its bottom end and being extracted from the soil by its top end.

The terms "upstream" and "downstream" are likewise defined relative to the direction in which the device is introduced into the soil, i.e. relative to the boring direction.

Advantageously, the coupling system is provided in the vicinity of the bottom end of the rotary shaft and of the tubular element. It can be understood that a portion of the bottom end of the rotary shaft is then coupled to a portion of the bottom end of the tubular element, while the coupling system is in its first configuration.

For example, the coupling system may be situated directly upstream from the mixer tool, or if there are two or more mixer tools, directly upstream from the mixer tool that is situated furthest upstream along the main axis.

In particular, when the rotary shaft and the tubular element are respectively a string of rods and a string of tubes, the coupling system is preferably secured to the bottom end rod of the string of rods and to the bottom end tube of the string of tubes.

As mentioned above, the coupling system serves to constrain the tubular element and the rotary shaft to move together in rotation in at least one direction around the main axis of the rotary shaft and to move together in translation at least in a downstream direction along the axis of the rotary shaft.

As is well known to the person skilled in the art, in order to reach a desired boring depth, the rotary shaft of a boring tool is generally constituted by a string of boring rods, in other words a plurality of rods mounted successively one after another. The connection between two successive boring rods is then often provided by screwing a threaded end of one of the rods to a complementary threaded end of the other rod.

In the same manner, the outer tubular element is generally constituted by a string of tubes, in other words a plurality of tubes mounted successively one after another.

In order to mount strings of tubes and of rods, a clamping device is generally provided, also known as a "guillotine". Such a device serves to prevent a first boring rod or a first boring tube that has been introduced into the soil from moving so that a second rod (or a second tube) can be screwed to its top end. Otherwise, rotation of the second rod (or second tube) would lead to simultaneous rotation of the first rod (or first tube) inside the borehole, thereby preventing proper screw fastening between the two elements.

When the rotary shaft is constituted in the above-described manner by a plurality of rods arranged end to end and connected together by threaded connections, the coupling system is generally adapted to constrain the tubular element and the rotary shaft to move together in rotation, at least in the rod screw-tightening direction, so as to prevent them from unscrewing while the tool is put into rotation.

Since the tubes and the rods are constrained to move together in rotation, the tubes are prevented from rotating when the rods are prevented from rotating. Consequently, when at least one rod and at least one tube (preferably the bottom end rod of the rotary shaft and the bottom end tube of the tubular element) are coupled together by the coupling system, it suffices for said rod to be prevented from moving by the clamping device to enable a new rod and a new tube to be put into place. Assembly thus takes place in a manner that is simple and fast.

In a variant embodiment, the coupling system may also be provided at the top end of the rotary shaft and of the tubular structure. When the rotary shaft and the tubular element are respectively a string of rods and a string of tubes, the coupling system is then secured to the top end rod of the string of rods and to the top end tube of the string of tubes.

After the portion of soil has been treated by means of the mixer tool, the tubular element can be removed together with the rotary shaft, or it may be left in the ground.

In particular when the tubular element needs to be removed together with the rotary shaft and the mixer tool, the coupling system may also be adapted to constrain the tubular element and the rotary shaft to move together in translation along the main axis in the upstream direction.

The coupling system may thus include abutment means adapted to co-operate with the rotary shaft so that the rotary shaft and the tubular element are constrained to move together in translation in the upstream direction regardless of the angular position of the rotary shaft. Since the coupling system does not need to be taken to its first configuration in order to withdraw the tool, this step of withdrawal is made considerably easier.

For example, the abutment means comprise a collar formed on the inside face of the tubular element, the inside diameter of said collar being smaller than the maximum diameter of the rotary shaft downstream from said collar.

In an advantageous provision of the invention, the coupling system is a bayonet system.

In the invention, a bayonet system is defined as being any fastener system having one or more lugs that, on being turned, engage in catches provided for this purpose.

In one embodiment, the coupling system includes at least one lug formed on the inside face of the tubular element and a corresponding number of catches formed on the rotary shaft, each lug being adapted to come into abutment radially and axially against a catch.

Conversely, in another embodiment, the coupling system may comprise at least one lug formed on the outside face of the rotary shaft and a corresponding number of catches formed on the tubular element, each lug being adapted to come into abutment against a catch both radially and axially.

The catches may be simple housings forming a single axial abutment and a single radial abutment.

In certain configurations, the rotary shaft and the tubular element are not withdrawn together from the borehole. The coupling system is then configured so that the rotary shaft and the tubular element are not constrained to move together in translation in the upstream direction.

In other configurations the coupling system may have other means enabling the two elements to be constrained to move together in translation in the upstream direction, in particular means enabling this to take place regardless of the angular position of the rotary shaft inside the tubular element, i.e. means of the type comprising the above-mentioned collar.

The catches may also be housings forming two axial abutments and one radial abutment. Under such circumstances, the coupling system is engaged (i.e. put into its first configuration) by a simple pivoting movement that serves to insert each lug between said abutments, and the coupling in rotation is obtained in one direction of rotation only, each lug being extracted from its respective catch when turned in the opposite direction.

In a variant, the catches may be L-shaped housings, each provided with a return segment enabling the lugs to be blocked in both directions of rotation. Under such circumstances, the system is engaged by performing a movement in rotation immediately followed by a movement in translation in order to bring the lug(s) into said return segments of the catches. Coupling for movement in rotation is obtained in both directions of rotation.

It can be understood that the coupling system may be formed by elements forming integral portions of the rotary shaft or of the tubular element.

The coupling system may also comprise additional elements that co-operate with the rotary shaft or the tubular element, in particular by being fastened to one or the other of those elements.

Certain portions forming the coupling system may also be removable, as specified below.

In an embodiment, the treatment device comprises at least two mixer tools that are spaced apart axially along the main axis.

In an embodiment, the various mixer tools may present different spans when they are in the deployed position.

For that purpose and by way of example, the mixer arms of the various mixer tools may present lengths that are different, in particular lengths that increase progressively going along the main axis.

The invention also provides a method of treating a portion of soil, in which method a treatment device as defined above is provided and the method further comprises at least the following steps:
  constraining the tubular element and the rotary shaft to move together by bringing the coupling system into its first configuration;
  lowering the rotary shaft into the soil together with the tubular element until reaching the portion of soil to be treated;
  unconstraining the rotary shaft and the tubular element by bringing the coupling system into its second configuration;
  moving the rotary shaft relative to the tubular element until the mixer tool is inserted into the portion of soil for treatment;
  deploying the mixer tool; and
  rotating the shaft while injecting a fluid into the portion of soil via the longitudinal pipe, whereby the portion of soil is mixed with said fluid.

By way of example, the injected fluid is a depolluting agent or a hydraulic binder.

In an implementation of the invention, after the portion of soil has been treated, the tubular element is extracted from the soil together with the rotary shaft.

In the treatment method of the present invention, the operations of boring and of mixing the soil with another material are performed directly one after the other without any intermediate withdrawal of the boring tool nor any introduction of a distinct mixer tool. Since the device used is both the boring device and the mixing device, it is necessary for the device to be lowered once only and to be raised once only.

This is particularly advantageous when the portion of soil that is to be treated is located at depth. The boring methods that consist in sinking rods into the soil progressively as the boring advances in order to reach the desired depth is awkward and time consuming. The same problem arises, after the borehole has been made, for assembling the mixer tool.

Performing the two steps of boring and mixing directly one after the other by using the same device enables the duration of the treatment method to be shortened considerably. Rods and tubes are assembled together as they advance on one occasion only, instead of on two occasions as happens when boring and mixing are performed using different tools.

In addition, because of the provisions of the invention, the rods and the tubes can be assembled together at the same time, given the presence of the coupling system. It is then no longer necessary, as with prior art devices, to begin by lowering the tubes, followed by lowering the rods.

Several embodiments are described in the present description. Nevertheless, unless specified to the contrary, characteristics described with reference to any one embodiment may be applied to any other.

BRIEF DESCRIPTION OF THE DRAWINGS

The invention can be better understood on reading the following description of an embodiment of the invention given by way of non-limiting example, and with reference to the accompanying drawings, in which:

FIGS. 4 and 5 are fragmentary views, respectively an elevation view and a perspective view of the rotary shaft of FIG. 1, showing a portion of the coupling system;

FIGS. 10A to 10F show steps of assembling a treatment device in an embodiment of the invention, in which the rotary shaft is a string of rods and the tubular element is a string of tubes;

FIG. 1 is a section view on a vertical plane showing a treatment device 10 of the invention, for treating a portion of soil defined from a depth P below the ground surface S. With reference to FIG. 9A, which shows a first step of the treatment method of the invention performed by means of said device 10, the portion of soil for treatment is given reference ST.

In the example, the device 10 is moved vertically for vertical boring. It is also possible to use the device 10 to perform horizontal boring or to perform boring on a slope.

Figure 1:
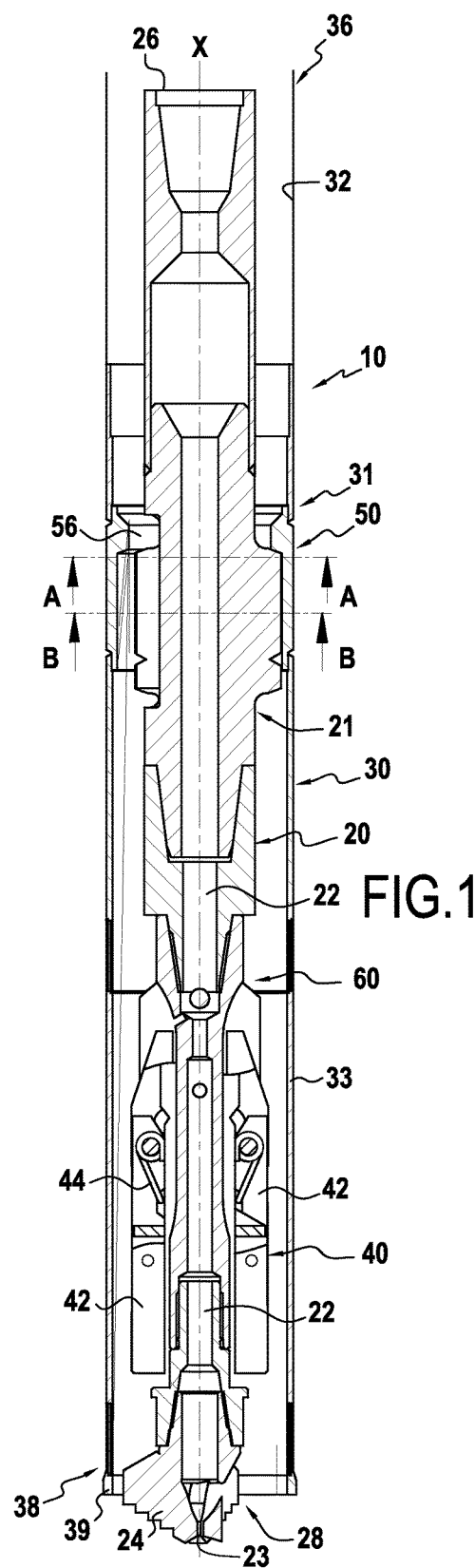
FIG. 1 is a section view of a treatment device in an embodiment of the invention, the coupling system being in its first configuration.

As can be seen in FIG. 1, the treatment device 10 has a longitudinal rotary shaft 20 of main axis X fastened to rotary drive means (not shown but known from elsewhere), and also to a hollow elongate element or external tubular element 30, in particular a tube, which in this example is coaxial with the rotary shaft 20 and surrounds it.

The treatment device 10 described in this example is used for performing a soil mixing method.

Soil mixing is a method that consists in treating a portion of soil by mixing the soil that has been broken up with a fluid, such as a slip or a reagent, in order to change its mechanical, physical, and/or chemical properties thereof.

In the example shown, the rotary shaft 20 has a boring tool 24 at its bottom end, e.g. a three-blade drill bit, for boring the soil so as to allow the device 10 advance.

Furthermore, a longitudinal pipe 22 passes through the rotary shaft in order to inject a fluid of the above-mentioned type in the proximity of the bottom end 28 of the shaft 20. In the example, the longitudinal pipe 22 passes through the boring tool 28 and opens out via an injection orifice 23 situated at the bottom end of said tool.

The outer tubular element 30 also has cutter teeth 39 at its bottom end 38.

When the portion of soil for treatment ST is deep underground, the rotary shaft 20 may be made up of a succession of rods that are screwed to one another. Likewise, the tubular element 30 may be in the form of a string of tubes.

In the example, and as described in greater detail below, both the rotary shaft 20 and the tubular element 30 are made up of respective assemblies, each of a plurality of successive segments, the segments being assembled together by screw fastening.

In the vicinity of its bottom end, the shaft 20 is provided with a deployable mixer tool 40 that comprises, in this example, two similar arms 42 arranged diametrically opposite each other on either side of the shaft 20.

Figure 9A:
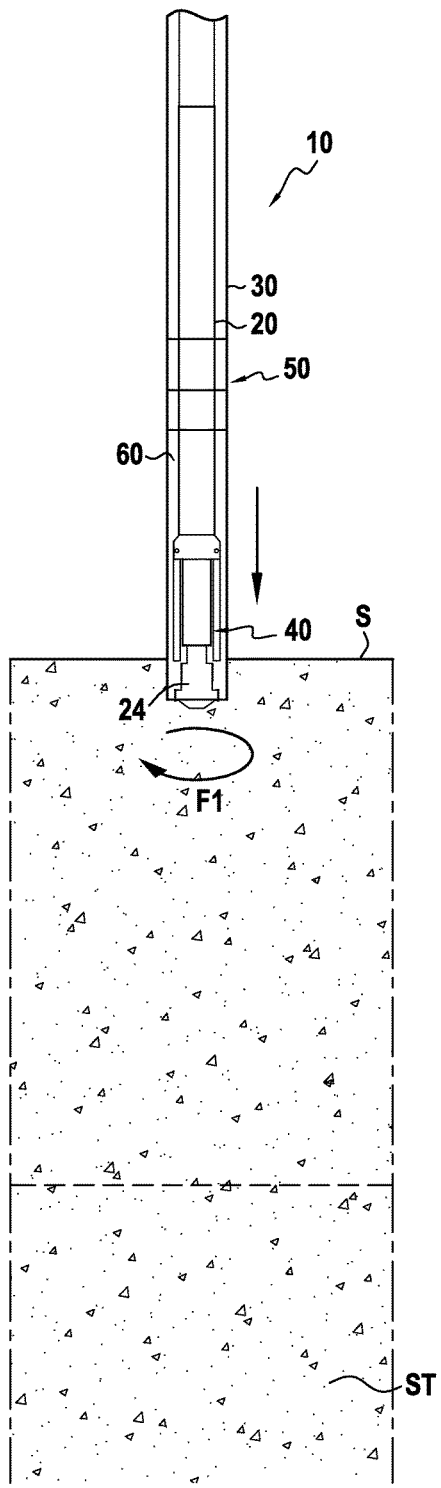
FIGS. 9A to 9F show successive steps of a method of treating a portion of soil in an implementation of the invention.
Figure 9B:
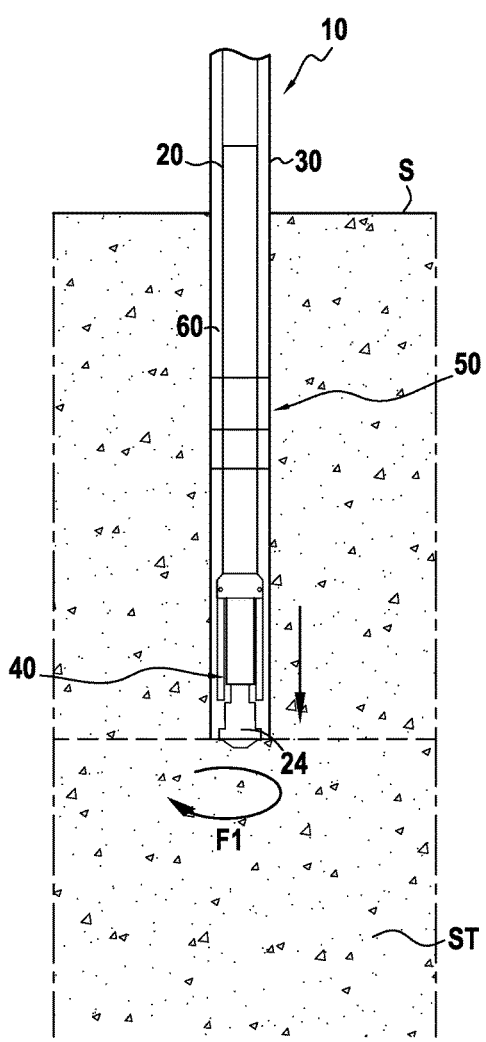
Figure 9C:
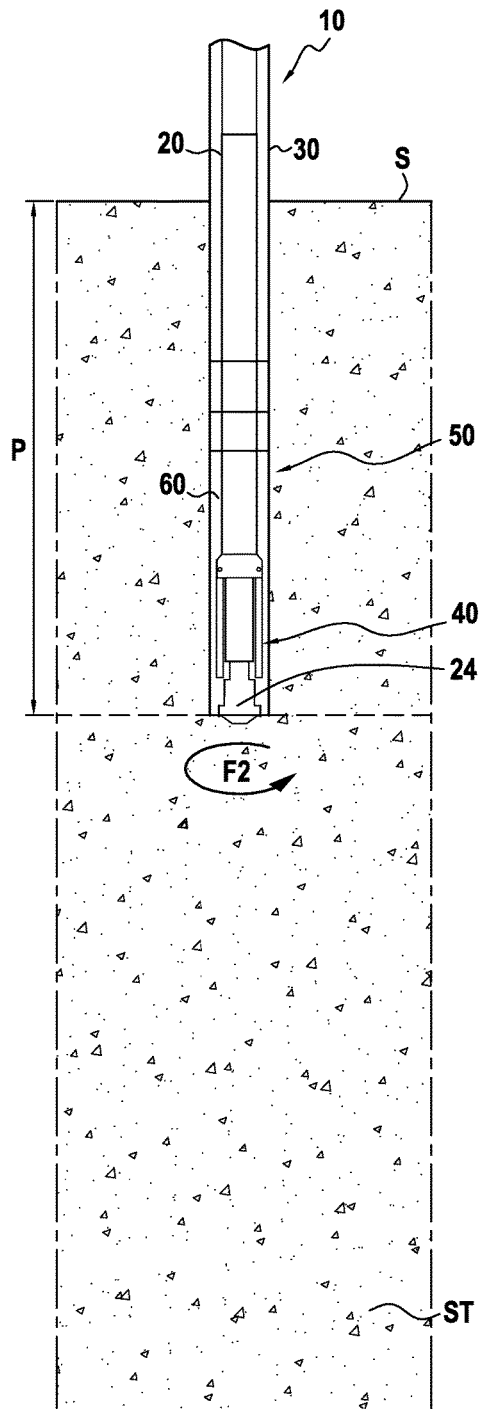

When the deployable tool 40 is in the tubular element 30, as shown in FIGS. 9A to 9C, the inside wall of the tubular element 30 acts on the arms 42 so as to bring them into a retracted position in which they extend along the bottom end of the shaft 20. In this position, the entire length of each arm 42 runs along the shaft 20. In this way, the boring tool 24 that projects at least in part beyond the bottom end of the tubular element 30 can pierce the soil freely.

Figure 9D:
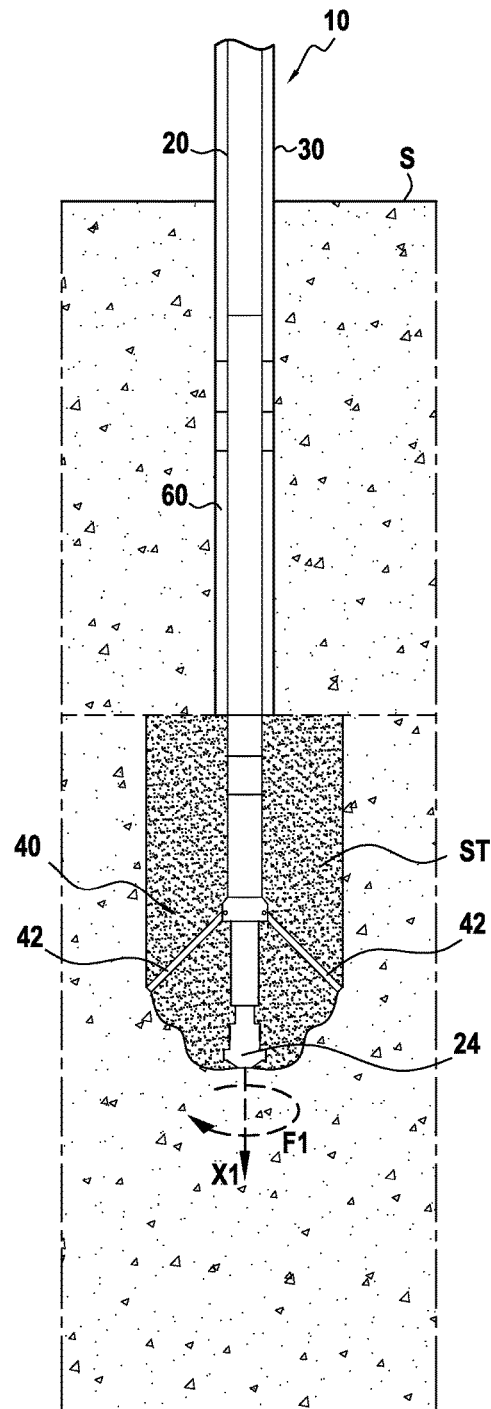
Figure 9E:
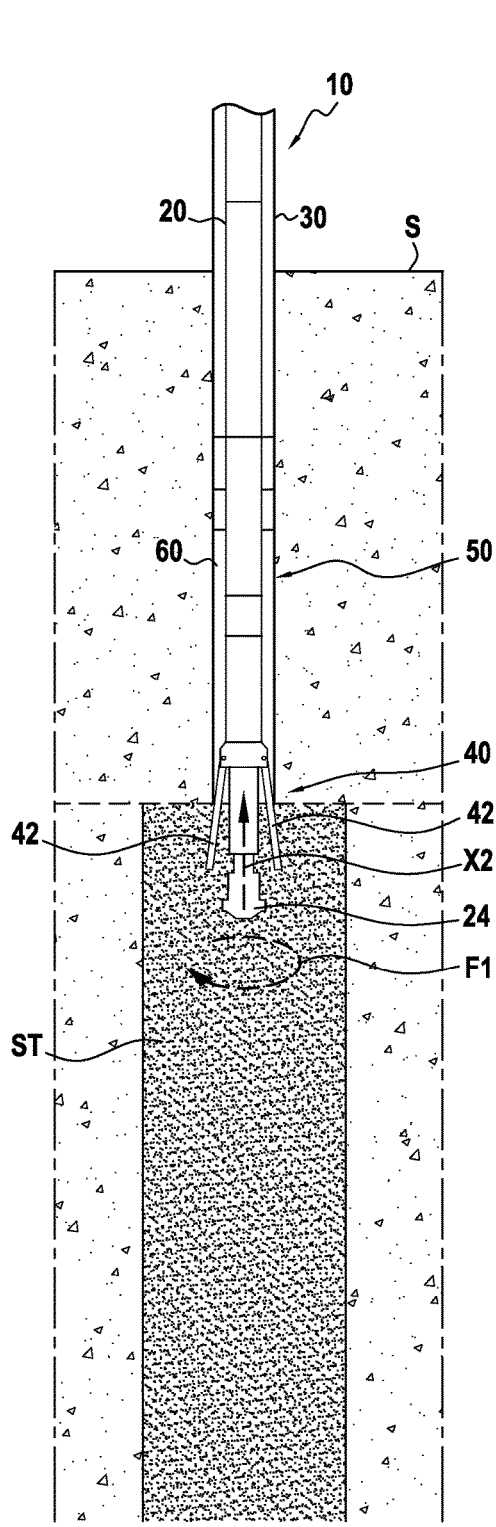
Figure 9F:
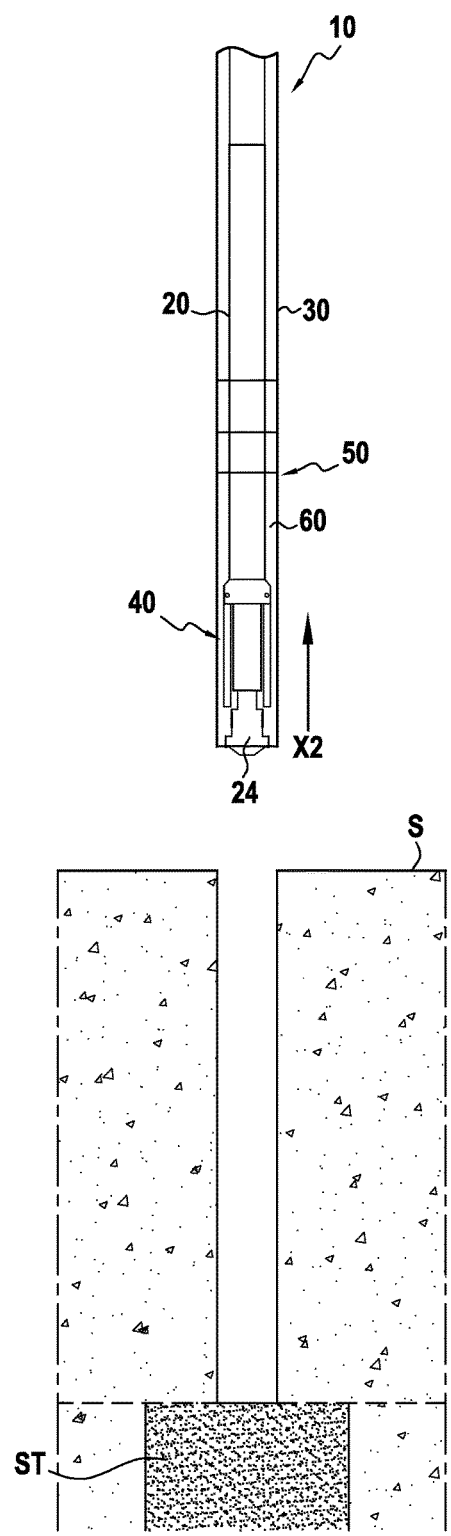

As can be seen in FIG. 9D, the two arms 42 are pivotally mounted of the bottom end 28 of the shaft 20 about axes that are orthogonal to the longitudinal direction X of the shaft 20. In this way, the arms 42 can extend laterally relative to the longitudinal direction X of the shaft 20.

Spring means 44 (see FIG. 1) are arranged between the rotary shaft 20 and each of the two arms 42 so that whenever the arms 42 are outside the tubular element 30 they have a natural tendency to deploy relative to the axis X of the shaft 20 because of the action of the springs 44.

In their deployed position, the arms 42 preferably form an angle that is open towards the bottom end of the shaft, as shown in FIG. 9D.

It can be understood that, in the deployed position, the arms 42 serve to destructure the soil when the shaft 20 is rotated.

Figure 8:
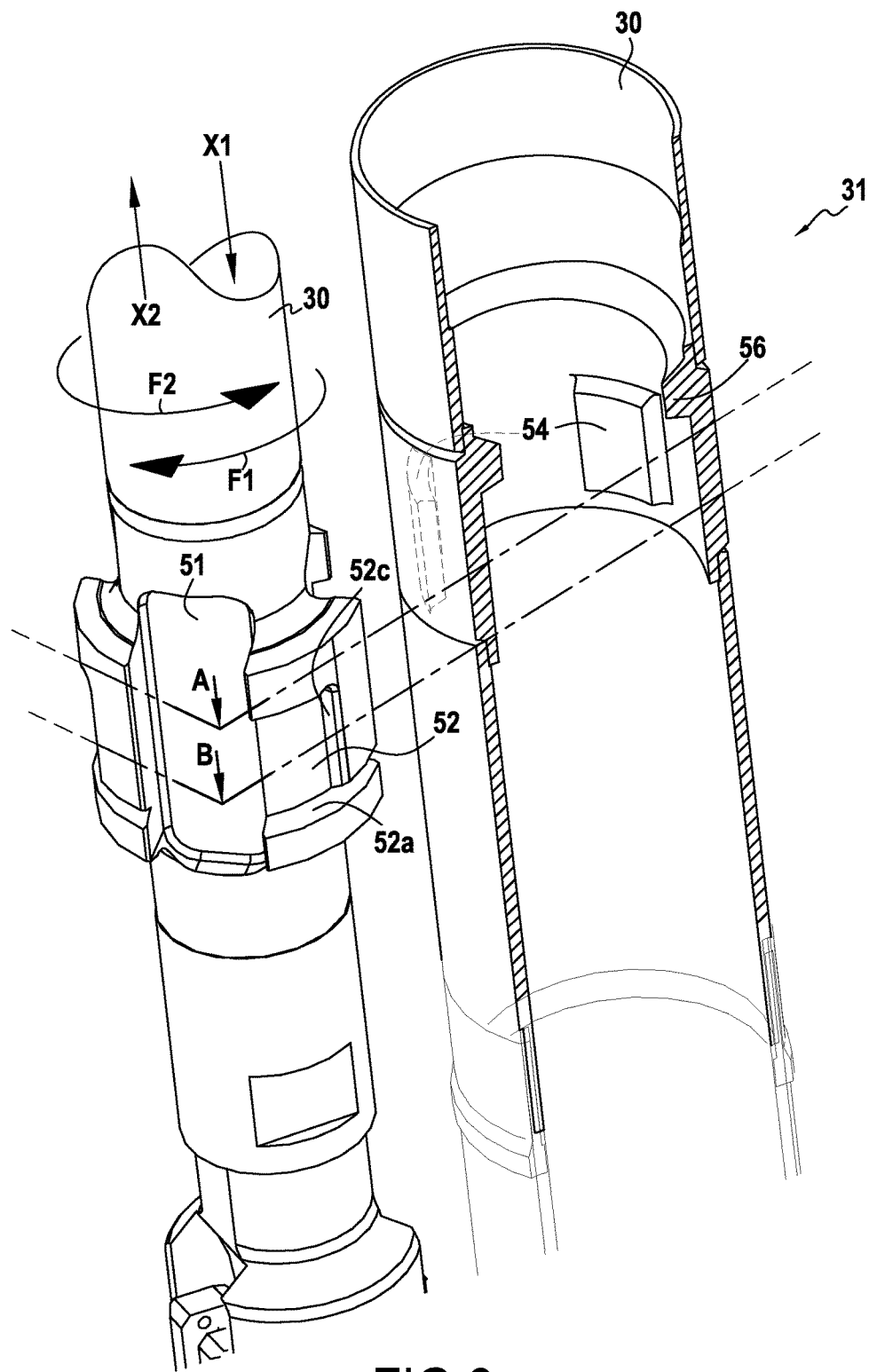
FIG. 8 is a fragmentary and exploded view of the coupling system.

As can be seen more clearly in FIG. 8, the rotary shaft 20 presents a section that is generally circular and of constant diameter. In the same manner, the tubular element 30 presents a section that is generally annular, with inside and outside diameters that are constant.

The outside diameter of the rotary shaft 20 is smaller than the inside diameter of the tubular element 30. As can be seen in FIG. 1, an annular passage 60 is thus conserved between the two elements 20 and 30. As described in greater detail below, this passage 60 enables boring waste to be raised, i.e. a mixture of loosened soil and boring fluid from the boring operation.

As can be seen in FIG. 1, the device 10 of the invention has a releasable coupling system 50 between the rotary shaft 20 and the tubular element 30.

When the rotary shaft 20 is housed inside the tubular element 20, in other words when the mixer tool 40 is in the retracted position, the coupling system 50 is situated upstream from the mixer tool 40.

In general, the coupling system 50 has first elements fastened to or forming integral portions of the tubular element 30, and second elements fastened to or forming integral portions of the rotary shaft 20. By co-operating, these first and second elements block certain degrees of freedom in relative movement between the tubular element 30 and the rotary shaft 20.

In the example, the coupling system 50 comprises a plurality of lugs 54 formed on the inside wall of the tubular element 30 and adapted to co-operate with a corresponding number of housings 52 formed on the outside wall of the rotary shaft.

Figure 6:
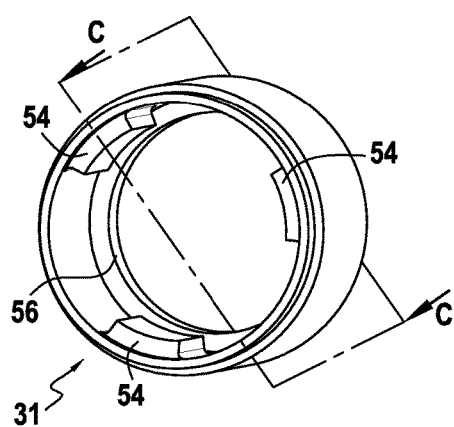
FIGS. 6 and 7 are fragmentary views of the tubular element, respectively in perspective and in section, showing a complementary portion of the coupling system.
Figure 7:
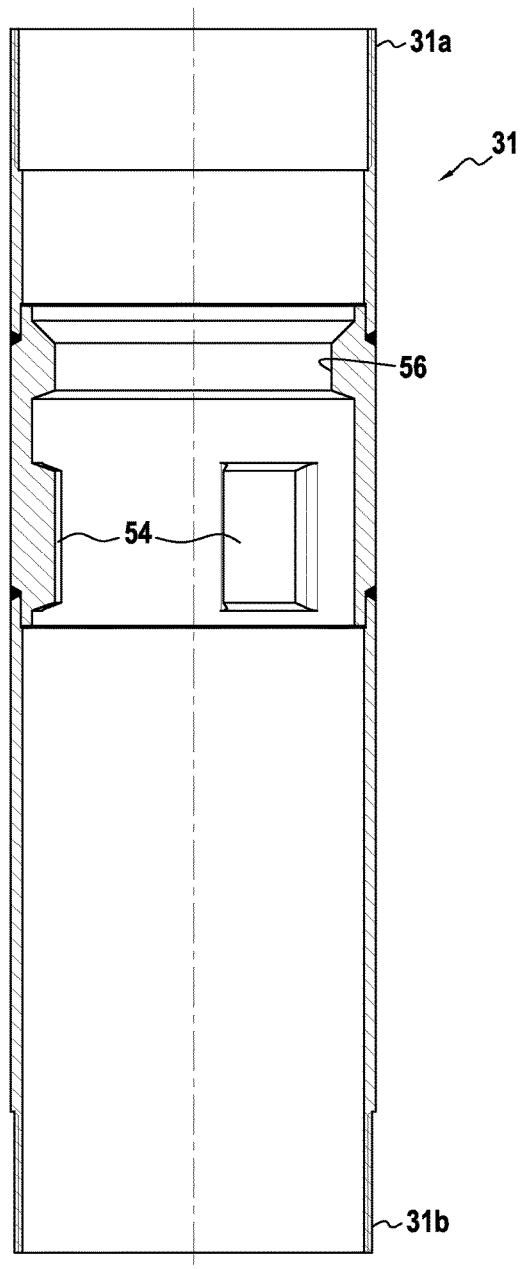

FIGS. 6 and 7 show a segment 31 of the tubular element 30 on which the lugs 54 are formed. This segment 31 is threaded at each end 31a, 31b in order to enable it to be fastened respectively to a head tube 32 and a foot tube 33 of the tubular element 30.

In this example, each lug 54 is in the form of an angular sector of an inside collar formed on the inside wall of the tubular element 30.

In this example the coupling system has three lugs 54 that are distributed on the inside wall of the tubular element so as to form angles of 120° relative to one another.

As can be seen in FIGS. 4, 5, and 8, the housings 52 are formed in projecting portions 53 that are formed on the periphery of the rotary shaft 20.

FIGS. 4 and 5 in particular show a segment 21 of the rotary shaft 20 having the projecting portions 53. This segment 21 is threaded at each end 21a, 21b for fastening to a complementary segment of the rotary shaft 20.

The outer radial faces of the projecting portions 53 run along the inside face of the tubular element 30.

Between the projecting portions 53, the rotary shaft 20 has grooves 51 extending longitudinally (i.e. in the main direction X). Each groove 51 co-operates with a respective one of the housings 52 and is of sufficient width to enable a lug 54 to be slide inside it in the axial direction.

Figure 2:
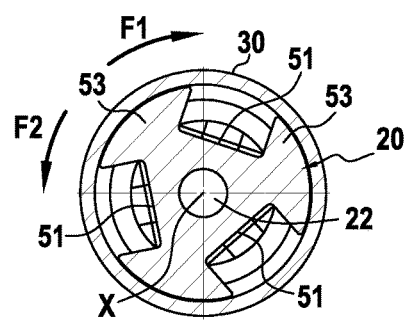
FIG. 2 is a section view on A-A of FIG. 1.
Figure 3:
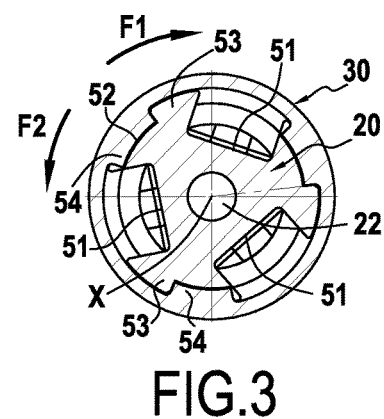
FIG. 3 is a section view on B-B of FIG. 1.

In FIGS. 2 and 3, it can be seen that the depth of the grooves 51 is selected so as to leave a flow section that is sufficient for the boring waste. The projecting portions 53 constitute flow restrictions for said waste, which restrictions can be compensated, at least in part, by said grooves.

In order to receive a lug 54, each housing 52 is in the form of a notch, specifically of profile complementary to the profile of the lugs 54, and formed in the outside walls of the projecting portions 53 of the rotary shaft 20.

The coupling system is said to be in its "first" configuration when each lug 54 is housed inside a housing 52.

Let F1 be the clockwise direction as shown in the various figures. In this configuration, if the rotary shaft 20 is set into rotation about the axis X in the direction F1, then each of the lugs 54 comes into abutment against the vertical wall 52c of its housing 52 (defined in a plane that is substantially axial). When the rotary shaft 20 moves, it thus drives the tubular element 30.

When the rotary shaft 20 is simultaneously moved downstream, i.e. downwards in the various figures (direction referenced X1), then the lugs 54 come into abutment against the upstream horizontal walls 52b of their housings 52 (defined in a radial plane). Consequently, the rotary shaft 20 drives the tubular element 30 in its movement in translation.

When the coupling system 50 is in its first configuration, and when as shown in FIGS. 9A and 9B the rotary shaft 20 is set into rotation in the clockwise direction F1 and moves in translation downstream (X1), i.e. into the depth of the soil, it takes the tubular element 30 with it.

The soil is loosened by the boring tool 24 in the center and by the boring teeth 39 at the periphery of the device 10. Simultaneously, the boring fluid, generally water, is delivered into the soil in the proximity of the boring tool 24, by the longitudinal pipe 22.

The mixture of soil and boring fluid rises via the annular passage 60 formed between the tubular element 30 and the rotary shaft 20. At the level of the coupling system 50, the mixture passes along the grooves 51 formed at the periphery of the shaft 20 between the projecting portions 53.

The movements in translation and in rotation are continued until the bottom end of the tubular element 30 reaches the portion of soil to be treated ST, in other words the depth P.

In order to enable the mixer tool 40 to be introduced into the portion of soil for treatment ST, the coupling system 50 is taken into its second position, as shown in FIG. 9C.

While the tubular element 30 is held in position, either by friction against the soil or by a clamping device provided for this purpose, the rotary shaft 20 is pivoted in the anticlockwise direction F2 through about 45° so that the lugs 54 are extracted from their respective housings 52 and put into the grooves 51.

As shown in FIG. 9D, the rotary shaft 20 is then moved in translation in a downstream direction (X1) until the lugs 54 leave said grooves 51.

The coupling system is then in its "second" configuration, in which the rotary shaft 20 and the tubular element 30 are no longer coupled together, whether in rotation or in translation.

The rotary shaft 20 can then be moved downstream (X1) until its bottom end, and in particular the mixer tool 40, becomes extracted from the tubular element 30 and penetrates into the portion of soil for treatment ST.

When the arms 42 are deployed, the shaft 20 is rotated while simultaneously injecting fluid into the portion of soil ST via the bottom end of the shaft 20, such that the treated zone is confined to said portion of soil.

Once the portion of soil has been treated down to the desired depth, the rotary shaft 20 is raised (X2) until the mixer tool 40 in particular is housed once more inside the tubular element 30.

The rotary shaft 20 is moved in translation upstream along the main axis X, and it is simultaneously caused to rotate.

Inevitably, since the outer tubular element is stationary, the grooves 51 of the rotary shaft 20 come into register with the lugs 54, which become received therein automatically.

In order to extract the tubular element together with the rotary shaft, it would be relatively complicated (although possible if using sufficient precision) to reinsert each lug 54 into one of the housings 52 for the purpose of coupling the rotary shaft 20 and the tubular element 30 in translation for upstream movement.

Consequently, as can be seen more particularly in FIG. 8, an internal collar 56 is formed upstream from the lugs 54 on the inside wall of the tubular element 30. This inside collar 56 has an inside diameter that is less than the diameter of the rotary shaft 20 in its portion situated downstream, in particular the diameter of the circle in which the projecting portions 53 are inscribed.

The collar 56 forms a continuous annular border that ensures that the rotary shaft 20 is blocked in translation relative to the tubular element 30 regardless of the angular position of the rotary shaft 20.

The abutment formed by the collar 56 makes it easy to withdraw the tubular element 30 simultaneously with the rotary shaft 20.

FIGS. 10A to 10F show the forward assembly of the device 10 of the invention in which the rotary shaft 20 and the tubular element 30 are respectively constituted by a string of rods and by a string of tubes.

In FIG. 10A, a bottom rod 201 (or first rod) of the rotary shaft 20 is fastened to a mover device comprising a rotary head 70, and it is surrounded by a bottom tube 301 (or first tube) of the tubular element 30. It should be observed that for reasons explained below, a portion of the first rod 201 projects from the top end of the first tube 301.

A coupling system 50 of the above-described type is formed between the first rod 201 and the first tube 301, and brought into its first configuration. In this configuration, the first rod 201 and the first tube 301 are coupled together in rotation in the direction for screwing the rods together, which also corresponds for obvious reasons to the direction of rotation of the device during boring operations.

As in the above-described example, a boring tool 24 is provided at the bottom end of the first rod 201, and a mixer tool 40 is provided between the coupling system 50 and the boring tool 24.

Two guillotines, respectively an upstream guillotine 81 and a downstream guillotine 82 are arranged in register with the location where boring is to be performed, and thus in register with the portion of soil to be treated.

In a first step, shown in FIG. 10B, the assembly is set into rotation by the rotary head 70 and it is moved in translation downstream so as to penetrate into the soil, until the first tube 301 is in register with the downstream guillotine 82 and the portion of the first rod 201 that extends beyond the tube 301 is in register with the upstream guillotine 81.

The downstream guillotine 82 is clamped around the first tube 301.

The first tube 301 and the first rod 201 are coupled together in rotation by the coupling system 50, so the first rod 201 is prevented from moving in the usual direction of rotation of the device.

In contrast, rotating the rod 201 in the opposite direction releases its coupling with the first tube 301.

In order to unscrew the rotary head 70, as shown in FIG. 10B, the first rod 201 is thus likewise held vise-like in the upstream guillotine 81.

Once unscrewed, the rotary head 70 is raised and the upstream guillotine 81 is loosened (see FIG. 10C), in order to enable a second rod 202 and a second tube 302 to be screwed respectively onto the first rod 201 and the first tube 301 (see FIG. 10D).

The assembly is once more set into rotation and introduced into the soil, as shown in FIG. 10E. Once again, the two guillotines 81, 82 are tightened.

The rotary head 70 is unscrewed.

As shown in FIG. 10F, the upstream guillotine 81 is once more loosened, and the rotary head 70 is moved away to enable a third rod and a third tube (no references) to be screwed respectively onto the second rod 201 and the second tube 301.

The above-described set of steps is repeated as often as necessary for the borehole to reach a sufficient depth.

Figures 11A, 11B, 12:
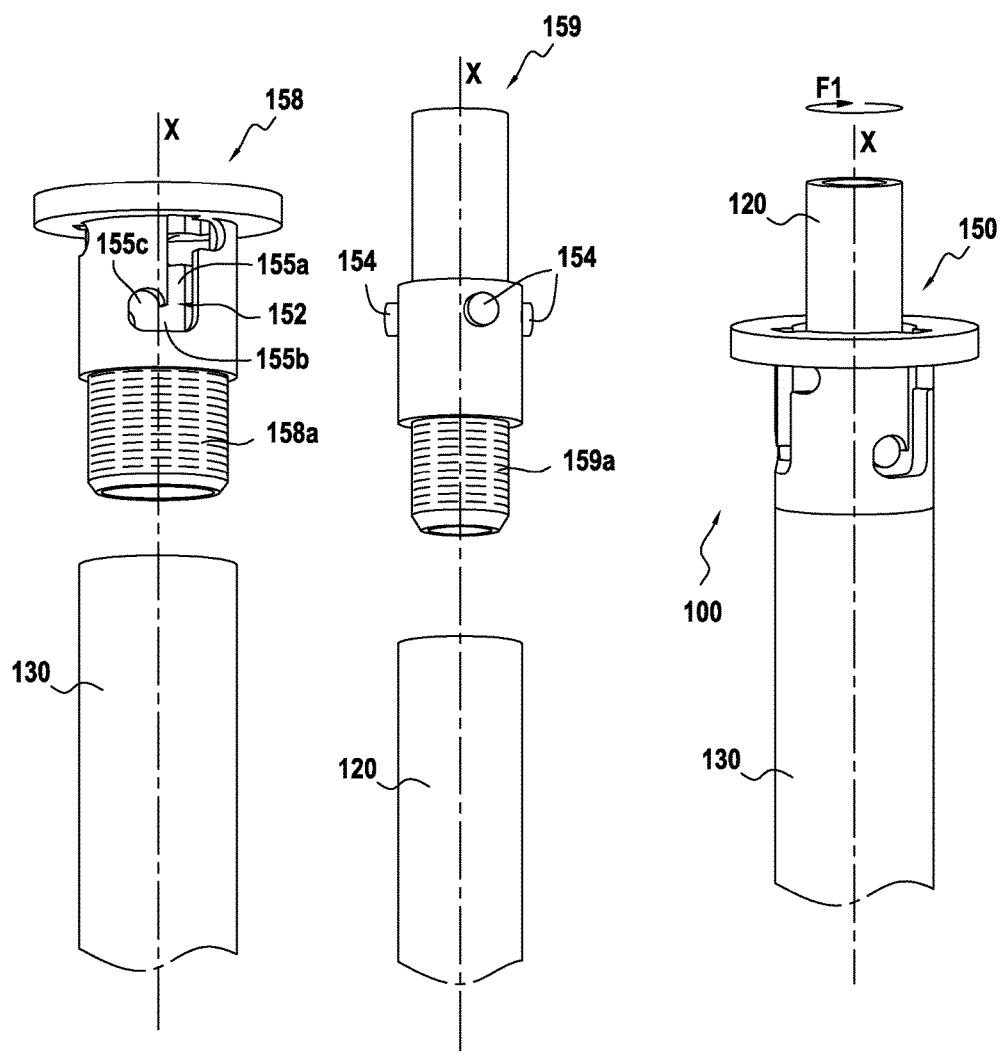
FIGS. 11A and 11B show a coupling system suitable for use in a treatment device in a second embodiment of the invention.
FIG. 12 shows the operation of the coupling system of FIGS. 11A and 11B in greater detail.

The treatment device 100 in a second embodiment of the present invention is shown in FIGS. 11A, 11B, and 12.

The mixer tool and the boring tool remain positioned as in the embodiment described above, and their respective structures likewise remain identical. They are therefore not shown and described again.

This embodiment differs from the preceding embodiment essentially in that the coupling system 150 is situated at the top end of the device 100.

Nevertheless, as above, it still comprises a bayonet system.

The coupling system 150 comprises a plurality of lugs 154 (three in this example), that are now formed on the outside wall of the rotary shaft 120, and a corresponding number of housings 152 formed in the wall of the tubular element 130.

Since the coupling system 150 is situated at the top end of the device, it is necessary for it to be capable of being dismantled in the event of the rotary shaft 120 and the tubular element 130 being constituted respectively by a string of rods and by a string of tubes.

In this example, the coupling system 150 thus has two parts 158 and 159 that are releasably fastened respectively to the top end of the tubular element 130 and to the top end of the rotary shaft 120.

A first part 158, in the form of a bushing, is adapted to co-operate with the top end of a tube of the tubular element 130 via its threaded end 158a (see FIG. 11A).

A second part 159, of substantially cylindrical shape, is adapted to co-operate with the top end of a rod of the rotary shaft 20 via its threaded end 159a (see FIG. 11B).

It can be understood that the three lugs 154 are adapted to slide in corresponding slots 152 formed in the first part 158.

In the example of FIG. 11A, each slot 152 presents a first segment 155a extending longitudinally in the direction of the axis X, a second segment 155b extending transversely to said first segment 155a, and a return segment 155c.

On the same principle as that described above with reference to the first embodiment, the coupling system 150 is said to be in its "first" configuration when each lug 154 is positioned in a corresponding return segment 155c formed in the tubular element 130.

In this first configuration, the rotary shaft 120 and the tubular element 130 are coupled together in translation in a downstream direction, and in rotation in the clockwise direction F1 (see FIG. 12).

The invention claimed is:

1. A treatment device for treating a portion of soil, the device comprising:
   a rotary shaft extending along a main axis and comprising a top end pointing upstream and a bottom end pointing downstream;
   a deployable mixer tool fastened to the rotary shaft in the vicinity of the bottom end of the rotary shaft;
   a longitudinal pipe configured to inject a fluid into the proximity of the bottom end of the rotary shaft;
   a boring tool situated at the bottom end of the rotary shaft;
   a tubular element extending along an axis parallel to the main axis of the rotary shaft, the rotary shaft being arranged inside said tubular element; and
   a coupling system coupling the rotary shaft with the tubular element, and configured to be selectively set in a first configuration and a second configuration, wherein:
      in the first configuration, said coupling system is configured to:
         constrain the tubular element and the rotary shaft to jointly move together in rotation about the main axis, in at least one direction of rotation, and
         constrain the tubular element and the rotary shaft to jointly move together in translation along the main axis, at least in the downstream direction, and
      in the second configuration, the coupling system is configured to release the tubular element and the rotary shaft from the joint movement in rotation and the joint movement in translation;
   wherein:
      in the first configuration, the deployable mixer tool is housed in the tubular element and fastened to the tubular element; and
      in the second configuration, the deployable mixer tool is unfastened from the tubular element and configured to radially extend from the tubular element into a portion of soil to be treated.

2. The treatment device according to claim 1, wherein the coupling system comprises a bayonet system.

3. The treatment device according to claim 2, wherein:
   the coupling system comprises at least one lug formed on the inside face of the tubular element and a corresponding number of catches formed on the rotary shaft, wherein:
      in the first configuration, the at least one lug is configured to come into abutment radially and axially against a catch, and
      in the second configuration, the at least one lug is configured to release from the catch.

4. The treatment device according to claim 1, wherein the deployable mixer tool comprises at least one deployable mixer arm fastened to the bottom end of the rotary shaft and configured to:
   in the first configuration, be retained in a retracted position by the housing; and
   in the second configuration, extend laterally relative to the main direction of the shaft, such that a span of the mixer tool is greater than the outside diameter of the tubular element to enable the portion of soil to be treated by rotating the shaft.

5. The treatment device according to claim 4, wherein the mixer tool further comprises a spring configured to:
   extend the mixer arm to from the tubular element, and
   retract the mixer are to the retracted position while the bottom portion of the shaft is housed in the tubular element.

6. The treatment device according to claim 1, wherein the coupling system is configured to constrain the tubular element and the rotary shaft to move together in rotation about the main axis in both clockwise and anticlockwise directions of rotation.

7. The treatment device according to claim 1, wherein the coupling system is also adapted to constrain the tubular element and the rotary shaft to move together in translation along the main axis in the upstream direction.

8. The treatment device according to claim 7, wherein the coupling system further includes an abutment adapted to co-operate with the rotary shaft so that the rotary shaft and the tubular element are constrained to move together in translation in the upstream direction regardless of the angular position of the rotary shaft.

9. A treatment device for treating a portion of soil, the device comprising:
- a rotary shaft extending along a main axis and presenting a top end pointing upstream and a bottom end pointing downstream;
- at least one deployable mixer tool fastened to the rotary shaft in the vicinity of its bottom end;
- a longitudinal pipe for injecting a fluid into the proximity of the bottom end of the rotary shaft;
- a boring tool situated at the bottom end of the shaft;
- an outer tubular element extending along an axis parallel to the main axis of the rotary shaft, the rotary shaft being arranged inside said tubular element; and
- a coupling system between the rotary shaft and the tubular element, said coupling system being suitable in a first configuration for constraining the tubular element and the rotary shaft to move together in rotation about the main axis, in at least one direction of rotation, and for constraining the tubular element and the rotary shaft to move together in translation along the main axis, at least in the downstream direction, and said coupling system being suitable in a second configuration for releasing said movement in rotation and in translation;
- wherein the deployable mixer tool is housed in the tubular element when the coupling system is in the first configuration;
- wherein the deployable mixer tool is adapted to be extracted and extended radially from the tubular element and to be introduced into a portion of soil to be treated when the coupling systems is in the second configuration,
- wherein the coupling system further includes an abutment adapted to co-operate with the rotary shaft so that the rotary shaft and the tubular element are constrained to move together in translation in the upstream direction regardless of the angular position of the rotary shaft, and
- wherein the abutment comprises a collar formed on the inside face of the tubular element, the inside diameter of said collar being smaller than the maximum diameter of the rotary shaft on the portion of said shaft that is situated downstream from said collar.

10. The treatment device according to claim 1, including at least two mixer devices that are spaced apart axially along the main axis.

11. A treatment device for treating a portion of soil, the device comprising:
- a rotary shaft extending along a main axis and presenting a top end pointing upstream and a bottom end pointing downstream;
- at least one deployable mixer tool fastened to the rotary shaft in the vicinity of its bottom end;
- a longitudinal pipe for injecting a fluid into the proximity of the bottom end of the rotary shaft;
- a boring tool situated at the bottom end of the shaft;
- an outer tubular element extending along an axis parallel to the main axis of the rotary shaft, the rotary shaft being arranged inside said tubular element; and
- a coupling system between the rotary shaft and the tubular element, said coupling system being suitable in a first configuration for constraining the tubular element and the rotary shaft to move together in rotation about the main axis, in at least one direction of rotation, and for constraining the tubular element and the rotary shaft to move together in translation along the main axis, at least in the downstream direction, and said coupling system being suitable in a second configuration for releasing said movement in rotation and in translation;
- wherein the deployable mixer tool is housed in the tubular element when the coupling system is in the first configuration;
- wherein the deployable mixer tool is adapted to be extracted and extended radially from the tubular element and to be introduced into a portion of soil to be treated when the coupling systems is in the second configuration, and
- wherein the coupling system is provided in the vicinity of the bottom end of the rotary shaft and of the tubular element.

12. A method of treating a portion of soil, wherein the treatment device according to claim 1 is provided, said method comprising:
- constraining the tubular element and the rotary shaft to move together by bringing the coupling system into its first configuration;
- lowering the rotary shaft into the soil together with the tubular element until reaching the portion of soil to be treated;
- unconstraining the rotary shaft and the tubular element by bringing the coupling system into its second configuration;
- moving the rotary shaft relative to the tubular element until the mixer tool is inserted into the portion of soil for treatment;
- deploying the mixer tool; and
- rotating the shaft while injecting a fluid into the portion of soil via the longitudinal pipe, whereby the portion of soil is mixed with said fluid.

13. The method of treating a portion of soil according to claim 12, wherein, after the portion of soil has been treated, the tubular element is extracted from the soil together with the rotary shaft.

14. The method of treating a portion of soil according to claim 12, wherein the injected fluid is a depolluting agent.

15. The method of treating a portion of soil according to claim 12, wherein the injected fluid is a hydraulic binder.

* * * * *